United States Patent
Kartoun et al.

(10) Patent No.: US 12,189,834 B2
(45) Date of Patent: Jan. 7, 2025

(54) CONTROLLING A DISPLAY BASED ON A PROXIMITY OF A PORTABLE DEVICE

(71) Applicant: International Business Machines Corporation, Armonk, NY (US)

(72) Inventors: Uri Kartoun, Cambridge, MA (US); Krishnan Sugavanam, Mahopac, NY (US); Jayanth Krishnan, Mahopac, NY (US); Aris Gkoulalas-Divanis, Waltham, MA (US)

(73) Assignee: International Business Machines Corporation, Armonk, NY (US)

( * ) Notice: Subject to any disclaimer, the term of this patent is extended or adjusted under 35 U.S.C. 154(b) by 530 days.

(21) Appl. No.: 17/183,963

(22) Filed: Feb. 24, 2021

(65) Prior Publication Data

US 2022/0269830 A1 Aug. 25, 2022

(51) Int. Cl.
 *G06F 21/00* (2013.01)
 *G06F 21/44* (2013.01)
 *G06F 21/84* (2013.01)
 *G09G 3/20* (2006.01)

(52) U.S. Cl.
 CPC .............. *G06F 21/84* (2013.01); *G06F 21/44* (2013.01); *G09G 3/20* (2013.01); *G09G 2358/00* (2013.01); *G09G 2370/06* (2013.01)

(58) Field of Classification Search
 CPC ................................ G06F 21/44; G06F 21/84
 See application file for complete search history.

(56) References Cited

U.S. PATENT DOCUMENTS

| | | | |
|---|---|---|---|
| 9,075,979 B1* | 7/2015 | Queru | H04W 64/00 |
| 9,916,430 B1* | 3/2018 | Mitter | G06F 21/316 |
| 9,986,404 B2 | 5/2018 | Mehta | |
| 10,120,977 B2 | 11/2018 | Coney | |
| 10,771,951 B2 | 9/2020 | Mehta | |
| 2007/0136195 A1* | 6/2007 | Banjo | H04M 15/83 705/43 |
| 2012/0036441 A1* | 2/2012 | Basir | H04L 67/04 715/734 |
| 2014/0277763 A1* | 9/2014 | Ramachandran | H05B 47/115 700/276 |
| 2015/0170446 A1* | 6/2015 | Burba | G07C 9/32 340/5.52 |
| 2015/0310173 A1 | 10/2015 | Coney | |
| 2015/0339285 A1* | 11/2015 | Safaei | G06Q 10/107 715/256 |
| 2017/0040002 A1* | 2/2017 | Basson | G09G 5/373 |
| 2017/0124362 A1* | 5/2017 | Sheng | G06K 7/10396 |
| 2017/0251347 A1 | 8/2017 | Mehta | |

(Continued)

OTHER PUBLICATIONS

Prima: A Privacy Management Architecture for Healthcare Systems, Anonymous; Nov. 6, 2008.

(Continued)

*Primary Examiner* — Rodman Alexander Mahmoudi
(74) *Attorney, Agent, or Firm* — Kelsey M. Skodje

(57) ABSTRACT

A method secures a computer display. One or more processors detect whether there is a presence of an authorized portable device proximate to the computer display. Based on what the processor(s) detect, the processor(s) apply a rule, which is based on one or more portable devices being proximate to the computer display, to selectively continue or end a current session on the computer display.

20 Claims, 5 Drawing Sheets

(56) References Cited

U.S. PATENT DOCUMENTS

| | | | |
|---|---|---|---|
| 2017/0303094 A1* | 10/2017 | Collar | G07C 9/28 |
| 2019/0066063 A1* | 2/2019 | Jessamine | G06F 21/629 |
| 2019/0081938 A1* | 3/2019 | Otsu | H04L 63/101 |
| 2019/0103192 A1* | 4/2019 | Bent | H04L 9/3239 |
| 2020/0068374 A1 | 2/2020 | Mehta | |
| 2020/0098455 A1 | 3/2020 | Duma | |
| 2021/0020007 A1* | 1/2021 | Vazirani | G08B 13/19695 |
| 2021/0407266 A1* | 12/2021 | Jarvis | G06N 3/02 |

OTHER PUBLICATIONS

Phone Tracker App information, Apple, 2021.
Detect and Locate Unauthorized Cell phones, Bastille, 2021.
Find My Phone App Information, Apple 2021.
Holistic, Policy-Driven, Access Control for Smarter Healthcare, Anonymous; Feb. 22, 2011.
Beacon Description, Wikipedia, Feb. 14, 2021.
Medical Privacy of Protected Health Information, CMS, Oct. 2019.
Method for the Automatic Filtering of Medical Data in Limited Resource Scenarios, Anonymous; Dec. 10, 2007.
Number tracker app information, 2021.
Patient Confidentiality, Privacy, and Security Awareness, Boston Medical Center, 2017-2018.
P. Mell et al., "The NIST Definition of Cloud Computing", National Institute of Standards and Technology, Information Technology Laboratory, Sep. 2011, pp. 1-7.
Smith, Alan, Top 15 Free Mobile Number Tracker in 2020, FindMyKids Blog, Jun. 12, 2019, 24 pages, from Wayback Machine, Internet Archive,<https://findmykids.org/blog/en/free-mobile-number-tracker>.

* cited by examiner

CONTROLLING A DISPLAY BASED ON A PROXIMITY OF A PORTABLE DEVICE

BACKGROUND

The present invention relates to the field of computer displays. Still more specifically, the present invention relates to the field of controlling whether a computer display is visible based on whether an authorized user and/or that user's portable device is within a predetermined proximity distance from the computer display.

Computer displays often present confidential information, whether in a medical environment, an industrial environment, a business environment, etc. Such computer displays in the prior art display any information created by and/or retrieved by a user. However, computer displays in the prior art do not address the issue of an unauthorized user looking at an unattended computer display that has data that has been created/retrieved by an authorized user. One or more embodiments of the present invention address this shortcoming of the prior art.

SUMMARY

In one or more embodiments of the present invention, a method secures a computer display. One or more processors detect whether there is a presence of an authorized portable device proximate to the computer display. Based on what the processor(s) detect, the processor(s) apply a rule, which is based on one or more portable devices being proximate to the computer display, to selectively continue or end a current session on the computer display.

In one or more embodiments of the present invention, the processor(s) further detect whether there is a presence of an unauthorized portable device proximate to the computer display. Based on what the processor(s) further detect, the processor(s) apply the rule to selectively continue or end the current session on the computer display.

In one or more embodiments of the present invention, the methods described herein are implemented in a computer program product and/or a computer system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
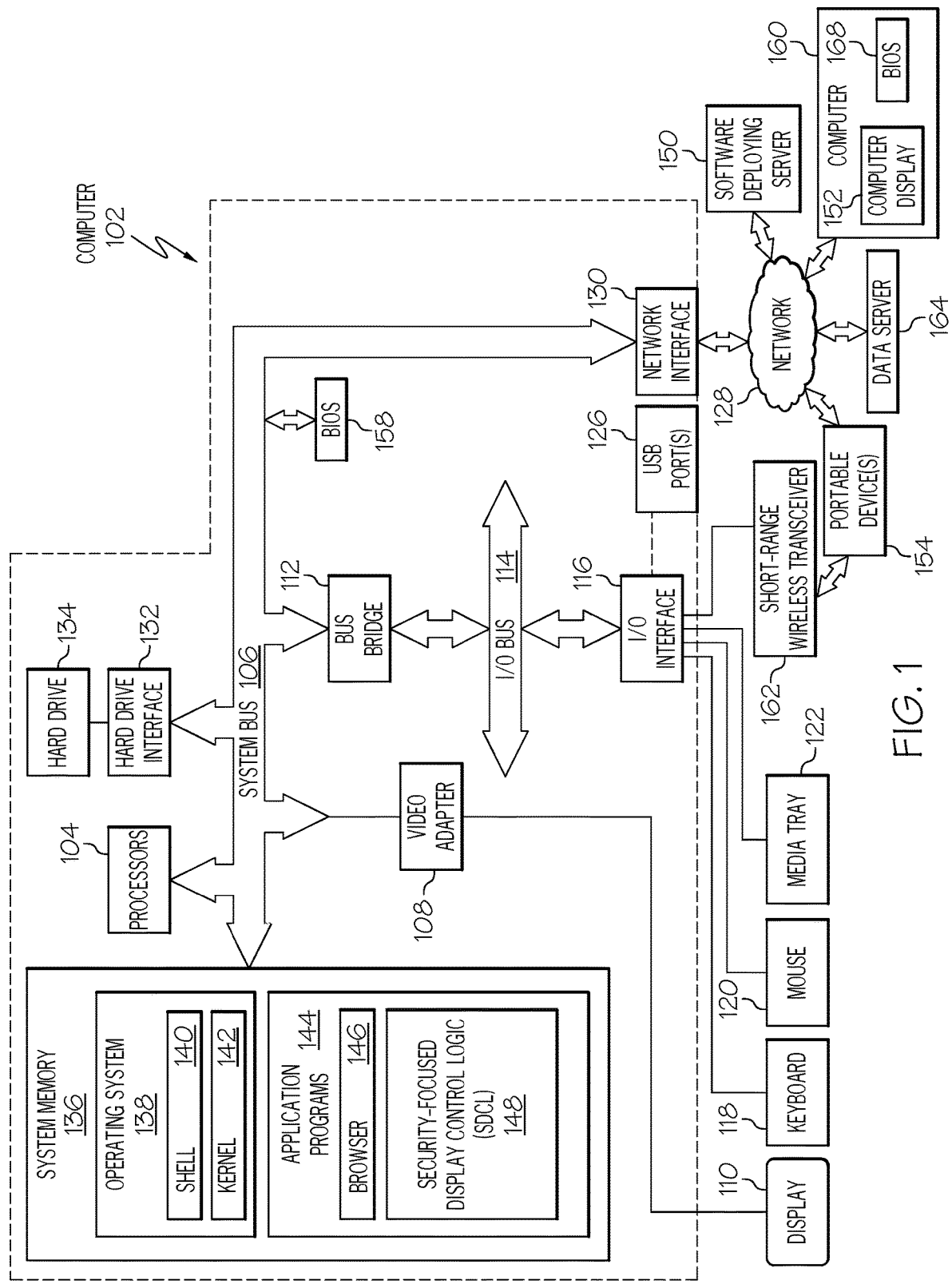
FIG. 1 illustrates an exemplary system and network used in one or more embodiments of the present invention.

In one or more embodiments, the present invention is a system, a method, and/or a computer program product at any possible technical detail level of integration. In one or more embodiments, the computer program product includes a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one or more embodiments, computer readable program instructions for carrying out operations of the present invention comprise assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. In one or more embodiments, the computer readable program instructions execute entirely on the user's computer, partly on the user's computer, as a stand-alone software package, partly on the user's computer and partly on a remote computer or entirely on the remote computer or server. In the latter scenario and in one or more embodiments, the remote computer connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

In one or more embodiments, these computer readable program instructions are provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one or more embodiments, these computer readable program instructions are also stored in a computer readable storage medium that, in one or more embodiments, direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one or more embodiments, the computer readable program instructions are also loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams represents a module, segment, or portion of instructions, which comprises one or more executable instructions for implementing the specified logical function(s). In some alternative implementations, the functions noted in the block occur out of the order noted in the figures. For example, two blocks shown in succession are, in fact, executed substantially concurrently, or the blocks are sometimes executed in the reverse order, depending upon the functionality involved. It will also be noted that, in one or more embodiments of the present invention, each block of the block diagrams and/or flowchart illustration, and combinations of blocks in the block diagrams and/or flowchart illustration, are implemented by special purpose hardware-based systems that perform the specified functions or acts or carry out combinations of special purpose hardware and computer instructions.

In one or more embodiments of the present invention, the terms "display", "computer display", "monitor", and "computer monitor" are used interchangeably to describe an electronic visual display for presenting information being input to and/or output from a computer system.

In one or more embodiments of the present invention, the terms "user" and "party" are used interchangeably to describe a person who is able to view a computer display.

In one or more embodiments of the present invention, a distance between a particular device and/or user and a particular computer display is assumed to be the same as the distance between that particular device and/or user and a computer that supports that particular computer display. That is, in one or more embodiments of the present invention, an assumption is made that either the computer and the display are positioned together, or else the display has processing logic that is able to determine the position/location/distance of the proximate mobile devices described herein.

Computer systems in the prior art offer little, if any, protection from being viewed and/or otherwise accessed by an unauthorized party after being properly activated by an authorized user. That is, assume that an authorized user logs onto a computer, and then enters and/or retrieves protected information (e.g., medical records, proprietary information of a company, personnel records, etc.), which is displayed on the computer screen. If that authorized user should walk away from the computer, and the display is not configured to automatically turn off within a short amount of inactivity time and/or that authorized user has not logged off the computer, then an unauthorized user can approach the computer and look at the protected information that lingers on the computer display after the authorized user left the area. Furthermore, even if an authorized user is still using that computer, an unauthorized user can "look over the shoulder" of the authorized user in order to view information that the unauthorized user is not permitted to view.

For example, if medical information about a first patient remains visible on a computer screen in an examination room after that first patient leaves, then a next second patient entering that examiner room is able to see the confidential information about the first patient if the health care provider failed to log off the computer or otherwise obscure the display on the computer.

In another scenario, assume that a bank of medical monitors in a hospital supervisory station, in which nurses, physicians, and other health care providers monitor medical video monitors that display patients' real-time medical information (e.g., heart rates, respiration rates, oxygen saturation levels, etc.) in a hospital or other health care facility, is visible to not only health care professionals working in the hospital/facility, but is also visible to any passerby. As such, an unauthorized person who is loitering near the hospital supervisory station can see the displayed confidential medical information about patients/residents in that facility.

As such, one or more embodiments of the present invention prevent unauthorized individuals from being able to see information on computer monitors that are located in a confidential, and yet public, setting such as a hospital, financial institution, school, etc.

In one or more embodiments of the present invention, the monitor/display on a computer is controlled by a proximity of an authorized user's mobile device (e.g., a smart phone). That is, when an authorized user's mobile device is within a certain proximity of the computer (e.g., within 10 feet), then the display remains on. However, if the authorized user takes the authorized user's mobile phone to a different location (e.g., that is more than 10 feet away from the computer), then the display screen automatically turns off, and can only be turned on again when the original or another authorized user's mobile device comes within the predefined proximity (e.g., 10 feet) of the computer/computer display.

In one or more embodiments of the present invention, a determination of whether a user's mobile device is authorized or not is based on a lookup table of authorized devices. For example, if a short-range signal from the mobile device is identified by the computer that supports the computer display, that computer looks up the identification information associated with that mobile device in a lookup table or other database, in order to determine if it is an authorized mobile device, whose proximate presence allows the computer display to be active/visible. Thus, if an authorized device is identified as being within a certain proximity of a particular computer, using one or more of the technologies described herein, such as Wi-Fi hotspots, short range field transceivers, etc., then the computer and its display either becomes fully operational automatically, or else the authorized user is given the opportunity to log into the computer, thus making the computer display capable of displaying information.

With reference now to the figures, and specifically FIG. 1, an exemplary computer system and/or network in accordance with one or more embodiments of the present invention is presented. Note that some or all of the exemplary architecture, including both depicted hardware and software, shown for and within computer 102 can be utilized by software deploying server 150 and/or portable device(s) 154 and/or computer 160 shown in FIG. 1, and/or computer 202 and/or computer display 210 shown in FIG. 2.

Exemplary computer 102 includes one or more processors 104 that are coupled to a system bus 106. Processor 104 can utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which can include storage devices such as CD-ROM drives, multi-media interfaces, etc.), a short-range wireless transceiver 162, and external USB port(s) 126. While the format of the ports connected to I/O interface 116 can be any known to those skilled in the art of computer architecture, in one embodiment some or all of these ports are universal serial bus (USB) ports.

As depicted, computer 102 is also able to communicate with software deploying server 150 and/or portable device(s) 154 and/or computer 160 using a network interface 130 to a network 128. Network interface 130 is a hardware network interface, such as a network interface card (NIC), etc. Network 128 can be an external network such as the Internet, or an internal network such as an Ethernet or a virtual private network (VPN). Network 128 can be a wired or wireless network, using both long range signals (e.g., a cellular network), mid-range signals (e.g., an Institute of Electrical and Electronics Engineers (IEEE) standard 803.1x compliant network), or short-range signals (e.g., an IEEE standard 802.15.x compliant network).

A hard drive interface 132 is also coupled to system bus 106. Hard drive interface 132 interfaces with a hard drive 134. In one or more embodiments, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a Security-focused Display Control Logic (SDCL) 148. SDCL 148 includes code for implementing the processes described below, including those described in FIGS. 2-3. In one embodiment, computer 102 is able to download SDCL 148 from software deploying server 150, including in an on-demand basis, wherein the code in SDCL 148 is not downloaded until needed for execution. Note further that, in one embodiment of the present invention, software deploying server 150 performs all of the functions associated with the present invention (including execution of SDCL 148), thus freeing computer 102 from having to use its own internal computing resources to execute SDCL 148.

Basic Input/Output System (BIOS) 158 is firmware used during a power-on startup process (known as "booting up") for a computer, such as computer 102. Booting up computer 102 and/or computer 160, either locally using a BIOS 168 in computer 160 or remotely using the BIOS 158 shown in computer 102, includes hardware initialization during the startup process, and provides runtime services for operating systems and programs in a computer.

As shown in FIG. 1, in one or more embodiments of the present invention, computer 160 not only has its own BIOS 168, but also has its own computer display 152. Thus, this computer display can be controlled remotely by computer 102, or locally by computer 160.

Short-range wireless transceiver 162 is a wireless transceiver that, in one or more embodiments of the present invention, is tuned to receive ultra-high frequency (UHF) wireless transmissions in the 2.402 GHz to 2.480 GHz range from portable device(s) 154 (e.g., smart phones).

Data server 164 is a database server that provides requested data to an authorized user of computer 102.

Note that the hardware elements depicted in computer 102 are not intended to be exhaustive, but rather are representative to highlight essential components required by the present invention. For instance, computer 102 can include alternate memory storage devices such as magnetic cassettes, digital versatile disks (DVDs), Bernoulli cartridges, and the like. These and other variations are intended to be within the spirit and scope of the present invention.

Figure 2:
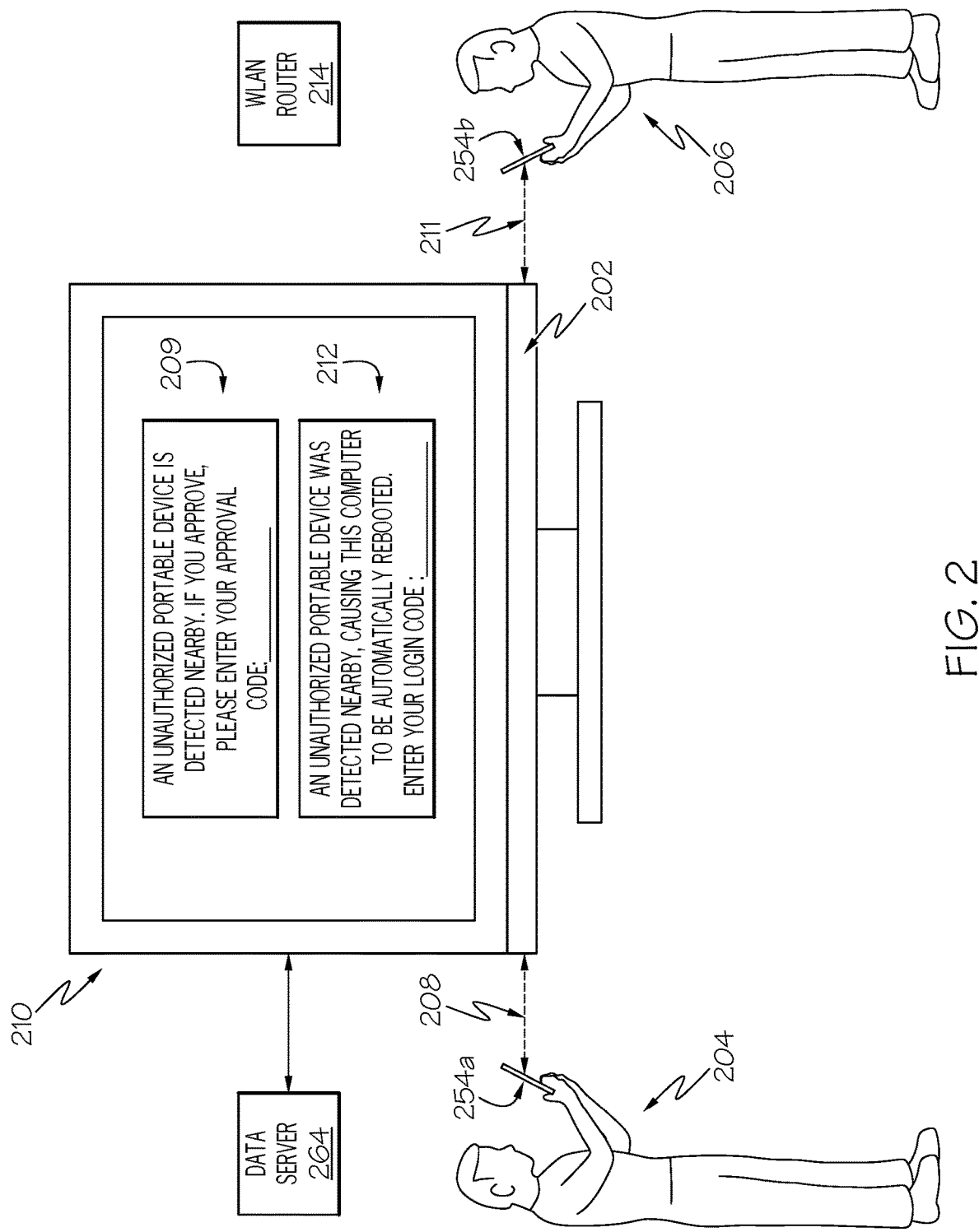
FIG. 2 depicts a high-level overview of one or more embodiments of the present invention.

With reference now to FIG. 2, a high-level overview of one or more embodiments of the present invention is presented.

As shown in FIG. 2, a computer 202 (analogous to either computer 102 or computer 160 shown in FIG. 1) is located within an area in which confidential information is accessed, input, and otherwise used, such as a medical facility, a research laboratory, a financial institution, etc.

As depicted in FIG. 2, an authorized user 204 is carrying (or is otherwise in the physical possession of) an authorized portable device 254a (analogous to one of the portable device(s) 154 shown in FIG. 1), and that authorized portable device 254a is on a list of portable devices that belong to specific persons and/or titles of persons who are authorized to use and view information shown on computer display 210 (analogous to display 110 in FIG. 1). For example, authorized portable device 254a could belong to a physician (authorized user 204) who uses computer 202 in order to view medical records for patients of that physician. As such, whenever that physician comes within a certain proximity of the computer display 210 (e.g., 10 feet, as indicated by line 208), the display will automatically come on, and/or that display will stay on as long as that physician is within 10 feet of the computer display 210, and/or computer system 202 will allow that physician to log on (e.g., by entering her password) a computer network, database, etc. by using computer 202 and its computer display 210.

Thus, in one or more embodiments of the present invention, if the system (e.g., computer 202, a computer display 210 that includes device interrogation logic such as a short-range signal detector, another system such as the wireless local area network router 214 discussed below, etc.) detects the user's authorized portable device 254a while the authorized user 204 is near (e.g., within 10 feet of) computer 202, then the authorized user 204 is able to log onto computer 202, and computer display 210 remains active as long as the authorized portable device 254a is near the computer display 210.

In one or more embodiments of the present invention, as long as the authorized user 204 (as evidenced by the presence of the authorized portable device 254a) is near the computer display 210, the computer display 210 will remain active, even if an unauthorized user 206 is nearby, as evidenced by the proximate presence of the unauthorized portable device 254b.

Thus, in one or more embodiments of the present invention, if the system (e.g., computer 202, a computer display 210 that includes device interrogation logic such as a short-range signal detector, another system such as the wireless local area network router 214 discussed below, etc.) detects a user's unauthorized portable device 254b while the authorized user 204 is still at (e.g., within 10 feet of) computer 202, then authorized user is warned of the presence of the unauthorized user 206. Unauthorized user 206 is identified by the presence of unauthorized portable device 254b, which is not on a list of authorized portable devices that may be within 30 feet (as indicated by line 211) of the computer display 210, as recognized by SDCL 148 shown in FIG. 1. If the authorized user 204 approves of the unauthorized user 206 viewing the information on the computer display 210 (e.g., the unauthorized user 206 is the patient, a consulting health care professional, etc.), then the authorized user 204 (the first physician) enters a code into message 209 allowing the computer display 210 to remain on.

In one or more embodiments of the present invention, if the system detects the unauthorized portable device 254b, either while the authorized user 204 is still at (e.g., within 10 feet of) computer display 210 or else is farther than 10 feet away from the computer display 210, then the computer 202 automatically reboots, and shows the message 212, inviting the authorized user 204 to log in again to computer 202. That is, in order for the authorized user 204 to again access his/her applications and/or databases, the authorized user 204 must re-sign in to computer 202 after it was rebooted, due to the presence of the unauthorized user 206.

Thus, in one or more embodiments of the present invention, a proximity presence (e.g., within 30 feet of computer display 210, as indicated by line 211) of the unauthorized person 206, as identified by his/her unauthorized portable device 254b (e.g., another smart phone) causes the computer display 210 to turn off, and/or the computer 202 to automatically reboot.

In one or more embodiments of the present invention, a short-range wireless transceiver (e.g., short-range wireless transceiver 162 shown in FIG. 1) within computer 202 and/or computer display 210 is tuned to receive ultra-high frequency (UHF) wireless transmissions in the 2.402 GHz to 2.480 GHz range from portable device(s) (e.g., authorized portable device 254a and/or unauthorized portable device 254b). As described herein, these UHF wireless transmissions, originally described in IEEE 802.15.x, are recognized by computer 202 as coming from one or more nearby portable devices (authorized portable device 254a and/or unauthorized portable device 254b). By measuring the signal strength of such UHF wireless transmissions, a lookup table of frequencies to known signal strengths enables SDCL 148 to determine how far away authorized portable device 254a and/or unauthorized portable device 254b is from computer 202. These UHF wireless transmissions also contain identification information, which identify what particular portable device (e.g., authorized portable device 254a versus unauthorized portable device 254b shown in FIG. 2) sent the UHF wireless transmission to computer 202.

In one or more embodiments of the present invention, computer 202 is within a "hot spot" created by wireless local area network (WLAN) router 214, which in one or more embodiments of the present invention comports with IEEE 803.1x. That is, the range of WLAN router 214 is selectively tuned to be limited to an area within a predefined distance (e.g., 30 feet) of computer 202. As such, any user holding a cellular phone that is in communication with WLAN router 214 is assumed to be within visual distance of the computer display 210, and is identified by matching cellular phone numbers from a list of authorized users 204 and/or unauthorized users 206. If an identified cellular phone number does not match the list of authorized users 204, or if an identified cellular phone number matches the list of unauthorized users 206, then the holder of the cellular phone using that phone number is assumed to be an unauthorized user 206.

Figure 3:
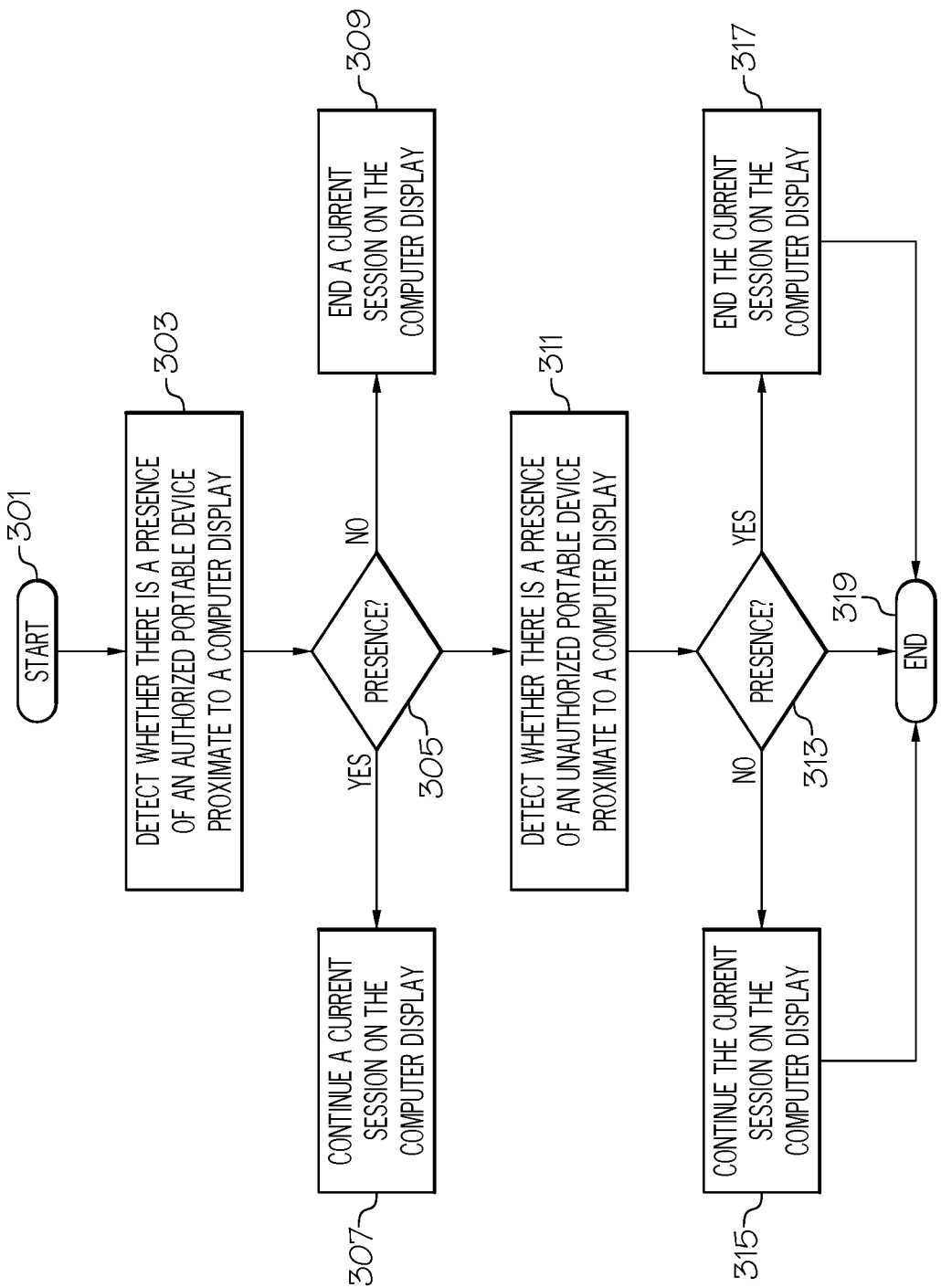
FIG. 3 illustrates a high-level flow chart of one or more steps performed in accordance with one or more embodiments of the present invention.

With reference now to FIG. 3, a high-level flow chart of one or more steps performed for securing a computer display in accordance with one or more embodiments of the present invention is presented.

After initiator block 301, one or more processors (e.g., processors 104 in computer 102 and/or computer 160 shown in FIG. 1) detect whether there is a presence of an authorized portable device (e.g., authorized portable device 254a, such as a smart phone, shown in FIG. 2) proximate to (e.g., within a certain distance, as indicated by line 208 in FIG. 2) the computer display (e.g., computer display 210 shown in FIG. 2), as shown in block 303. Responsive to a result of whether the one or more processors detect an authorized portable device, the one or more processors apply a rule to selectively maintain or end a current session on the computer display. In one or more embodiments of the present invention, this rule is based on one or more portable devices being proximate to the computer display, as described in the scenarios shown in FIG. 2.

That is, as shown in query block 305, the processors make the query as to whether or not an authorized portable device is within the predefined distance of the computer display. In one or more embodiments of the present invention, the presence of the authorized portable device authorizes use of any computer display within a predefined proximity region (e.g., any computer display within a hospital). In one or more embodiments of the present invention, the presence of the authorized portable device authorizes use of only a particular computer/computer display, within proximity of the authorized portable device, that is designated to be used by the authorized user who holds/carries/possesses the authorized portable device.

If there is an authorized portable device within the predefined distance of the computer display, then a current session (or alternatively, an initiating session, if there is not a current session in progress) is continued/initiated on the computer and the computer display, as shown in block 307.

However, if there is not an authorized portable device within the predefined distance of the computer/computer display, then a current session on the computer display is ended, as shown in block 309.

In one or more embodiments of the present invention, the rule that is applied dictates that a session is ended by selectively obscuring the computer display rather than ending communication between a serving application and the computer display. That is, in one or more embodiments of the present invention, if an authorized mobile device 254a shown in FIG. 2 is not within a predefined distance of the computer 202, then one or more scenarios occur. In a first scenario, the computer display 210 is simply turned off. In a second scenario, communication between data server 264 (analogous to data server 164 shown in FIG. 1) is ended by ending the communication session, and/or by closing the application (e.g., a web browser) that accesses data from the data server 264.

Returning to FIG. 3, in one or more embodiments of the present invention the one or more processors detect whether there is a presence of an unauthorized portable device proximate to the computer display, as shown in block 311. Responsive to detecting the presence of the unauthorized portable device proximate to the computer display, the one or more processors apply the rule for portable devices proximate to the computer display to selectively continue or end the current session on the computer display.

That is, as shown in query block 313, a query is made as to whether an unauthorized mobile device (e.g., unauthorized mobile device 254b shown in FIG. 2) is within a predefined distance (see line 211 in FIG. 2) of the computer display 210.

If there is not an unauthorized mobile device within the predefined distance of the computer display, then the current session continues uninterrupted, as shown in block 315.

However, if an unauthorized mobile device is within the predefined distance of the computer display, then the current session with the computer is ended (block 317), by turning off the computer display, ending an application that is displaying data on the computer display, ending a communication session between the computer and a database server, etc.

The flow chart ends at terminator block 319.

In one or more embodiments of the present invention, one or more processor further detect that an unauthorized portable device is proximate to the computer display. Responsive to detecting that the unauthorized portable device is proximate to the computer display, the one or more processors immediately reboot a computer device that supports the computer display, where the computer device has a basic input-output system (BIOS) chip that has been configured to require an authentication by an authorized user in order to allow the computer display to display any content other than an authentication screen.

As discussed above, Basic Input/Output System (BIOS) 158 is firmware used during a power-on startup process (known as "booting up") for a computer, such as computer 102. Booting up computer 102 and/or computer 160, either locally using a BIOS 168 in computer 160 or remotely using the BIOS 158 shown in computer 102, includes hardware initialization during the startup process, and provides run-time services for operating systems and programs in a computer. In one or more embodiments of the present invention, the code in BIOS 158 is modified such that a special authentication screen is presented to the user before any other application program is entered.

For example, consider message 212 shown on computer display 252 (analogous to computer display 152 shown in FIG. 1) on computer 202 (analogous to computer 102 in FIG. 1). In one or more embodiments, computer 102 and computer 160 in FIG. 1 are the same computer. In one or more embodiments of the present invention, display 110 and computer display 152 are the same display. In one or more embodiments, computer 102 and computer 160 in FIG. 1 are different computers, in which computer 160 is managed by computer 102. In one or more embodiments of the present invention, display 110 and computer display 152 are different displays, such that computer display 152 is either remotely managed/controlled by computer 102 or locally managed/controlled by computer 160.

For purposes of illustration of one or more embodiments of the present invention, assume now that computer 202 shown in FIG. 2 is computer 102 shown in FIG. 1, and that computer display 210 shown in FIG. 2 is display 110 shown in FIG. 1. Assume now that a security event caused computer 202 to automatically reboot. In one or more embodiments of the present invention, such security events include authenticated user 204 and that user's authorized mobile device 254a moving more than some predetermined distance (e.g., into another room) away from computer 202; and/or unauthenticated user 206 and that user's unauthorized mobile device 254b coming within some other predefined distance (e.g., within 30 feet) of the computer 202.

Whenever such a security event occurs, a security program within computer 202 (e.g., SDCL 148 shown in FIG. 1) will cause computer 202 to automatically reboot by using BIOS 158, which has been modified to first call a program that displays message 212 on computer display 210. Once computer 202 authenticates the user's authentication code (by running code within SDCL 148 shown in FIG. 1), the display is unlocked and access is permitted to the authenticated user 204.

In one or more embodiments of the present invention, one or more processors detect that an unauthorized portable device is proximate to the computer display. Responsive to detecting that the unauthorized portable device is proximate to the computer display, the processor(s) immediately display a message on the computer display stating that the unauthorized portable device is proximate to the computer display, and then present an active window to selectively continue or terminate the current session on the computer display. The processor(s) receive a user-selection on whether to continue or terminate the current session on the computer display and, responsive to receiving the user-selection, selectively terminate the current session on the computer display.

For example, assume that the computer display 210 and/or computer 202 and/or WLAN router 214 shown in FIG. 2 detect the presence of unauthorized mobile device 254*b* while authorized user 204 is using the computer display 210. In one or more embodiments of the present invention, the computer display 210 and/or computer 202 and/or WLAN router 214 has previously detected the authorized mobile device 254*a*, while in one or more other embodiments of the present invention, the computer display 210 and/or computer 202 and/or WLAN router 214, but the authorized user 204 has logged onto computer 202 in an authorized manner (e.g., by entering a logon password).

In either scenario in this embodiment, whenever the computer display 210 and/or computer 202 and/or WLAN router 214 detect the proximity presence (e.g., within 30') of the unauthorized mobile device 254*b*, it will present a message on the computer display 210 asking the user whether the current session should continue or not. If the user enters "Yes, continue", then the session will continue without any changes. If the user enters "No", then the system will selectively turn off the computer monitor 210, and/or end the current session by ending a local application and/or stopping communication with an application server and/or a database server, and/or will pixilate an image on the screen such that it is unreadable.

In one or more embodiments of the present invention, once the computer display 210 and/or computer 202 and/or WLAN router 214 detect that the unauthorized mobile device 254*b* is no longer proximate to the computer monitor 210, the pixilation will end such that the information displayed on the computer monitor 210 is once again readable.

In one or more embodiments of the present invention, the pixilation described above automatically occurs whenever the computer display 210 and/or computer 202 and/or WLAN router 214 detect the unauthorized mobile device 254*b*, without receiving any input/instructions from the authorized user 204 or any other person.

Thus, and in one or more embodiments of the present invention, the processor(s) detect that an unauthorized portable device is proximate to the computer display. Responsive to detecting that the unauthorized portable device is proximate to the computer display, the processor(s) automatically obscure (e.g., by pixilation, dimming, washing out with colors or lighting intensity, etc.) information on the computer display until the unauthorized portable device is no longer proximate to the computer display. In one or more embodiments of the present invention, once the unauthorized portable device is no longer proximate to the computer display, the operation of the computer display returns to normal, such that information one the computer display is once again readable.

In one or more embodiments of the present invention, the rule ends a session if an authorized device leaves a proximate vicinity to the computer display. For example, if authorized user 204 carries his/her authorized mobile device 254*a* to a position that is beyond some predefined distance, then the computer display is turned off and/or a session with a database server is ended while erasing any data shown on the computer display.

In one or more embodiments of the present invention, the rule allows a device to be authorized for a specified period of time. That is, besides requiring that an authorized mobile device be within a certain distance of the computer display, the computer display is only allowed to be on for a specified period of time, either in a certain time window or a certain time length.

That is, in one or more embodiments of the present invention, computer display 210 shown in FIG. 2 is only allowed to be turned on during certain time periods (e.g., from 8:00 am to 5:00 pm, Monday through Friday), and only if an authorized mobile device is within a predefined distance of the computer display.

In one or more embodiments of the present invention, computer display 210 shown in FIG. 2 is only allowed to remain turned for a certain length of time after the authorized mobile device is moved beyond the predefined distance required to turn on the computer display. For example, the computer display can be left on for only 1 minute after that authorized user/authorized user device leave the proximity of the computer display.

In one or more embodiments of the present invention, the rule allows a session to be continued in a presence of an unauthorized device and an authorized device. That is, in one or more embodiments of the present invention, if the authorized mobile device 254*a* is within a predefined distance of the computer display 210 shown in FIG. 2, the presence of the unauthorized device 254*b* will not affect what is displayed on the computer display 210, thereby allowing the authorized user 204 to discuss the content being displayed to an otherwise unauthorized person 206 (e.g., a consulting party whose cell phone is not listed as an authorized mobile device).

In one or more embodiments of the present invention, the rule allows a device to be authorized for a subset of computer displays supported by a computing environment. For example, assume that a bank of computer displays is for different patients in a hospital. Rather than allowing a single authorized user in possession of an authorized mobile device to have access to all of the computer displays, the rule only allows that authorized user/authorized mobile device to activate certain specific computer displays (e.g., displays showing real time medical sensor information about patients of that authorized user).

In one or more embodiments of the present invention, the rule dictates that a session ends if an authorized device is not proximate to the computer display for a predetermined period of time. That is, if authorized user 204/authorized user device 254*a* are away from the computer display 210 shown in FIG. 2 for more than a certain predefined amount of time (e.g., 1 minute), then the computer display 210 is turned off and/or computer 202 directs information being shown on the computer display to be removed.

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
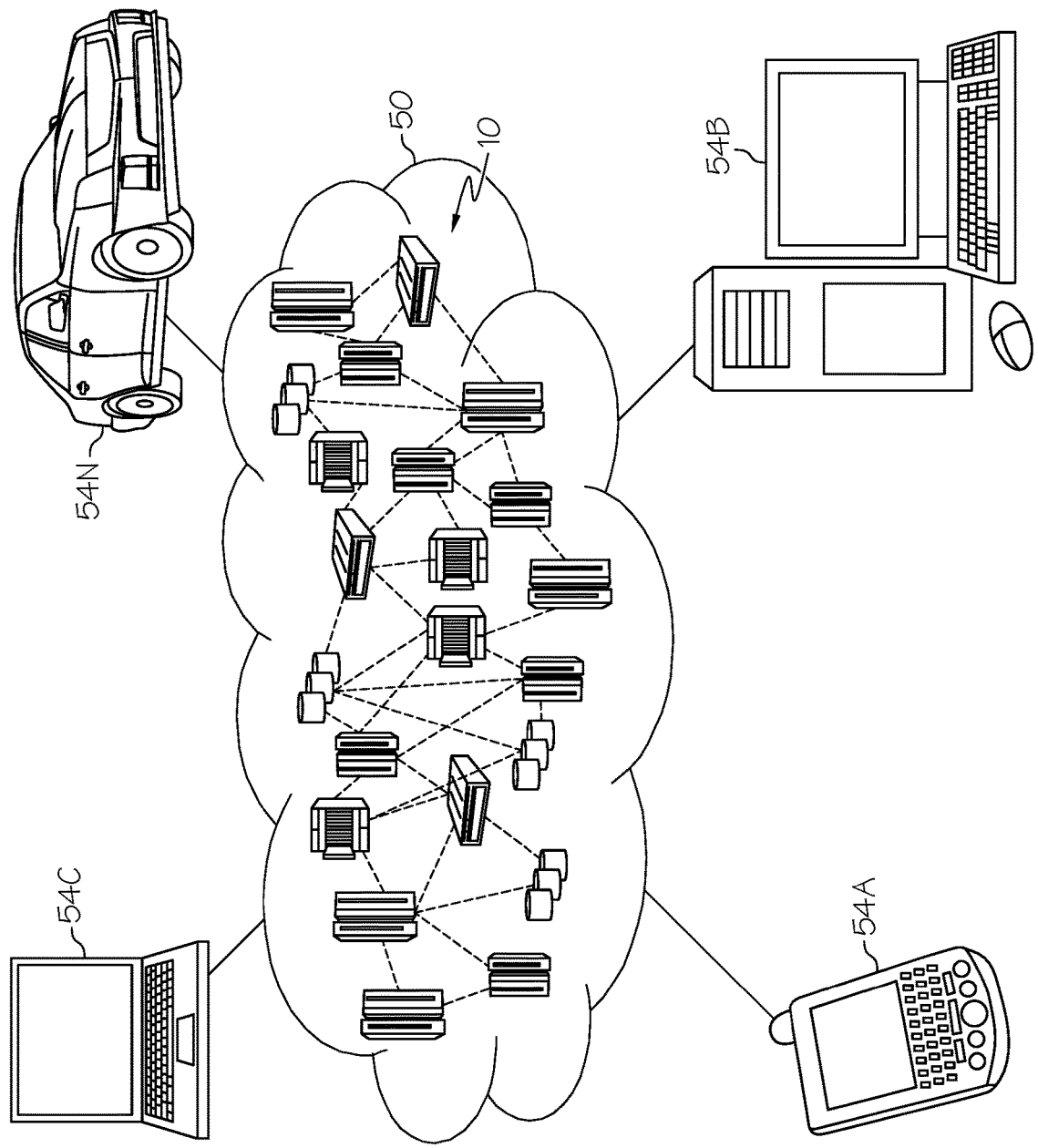
FIG. 4 depicts a cloud computing environment according to one or more embodiments of the present invention.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 4 are intended to be illustrative only and that computing nodes 10 and cloud computing environment 50 can communicate with any type of computerized device over any type of network and/or network addressable connection (e.g., using a web browser).

Figure 5:
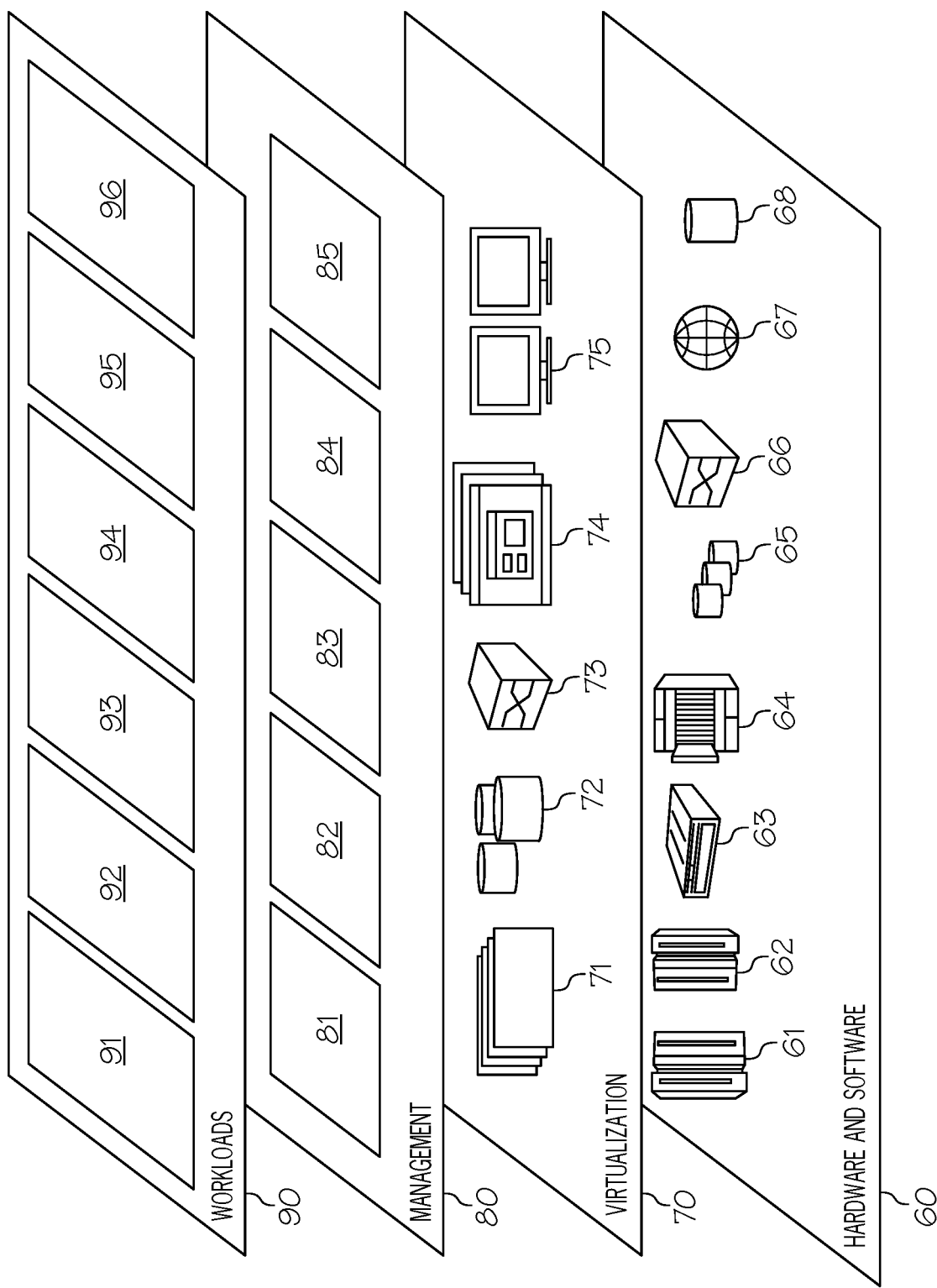
FIG. 5 illustrates abstraction model layers of a cloud computer environment according to one or more embodiments of the present invention.

Referring now to FIG. 5, a set of functional abstraction layers provided by cloud computing environment 50 (FIG. 4) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and computer display security control processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present disclosure are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for securing a computer display, the method comprising:
    detecting, by one or more processors and a wireless local area network (WLAN) router having a range tuned to an area within a predefined distance of the computer display, a first portable device within the area;
    identifying the first portable device as an authorized portable device in response to determining that the first portable device corresponds to a first individual who is authorized to view selected information;
    displaying, by the one or more processors and in response to the detecting and the identifying the first portable device, the selected information on the computer display;
    detecting, by the one or more processors and the WLAN router, a second portable device within the area;
    identifying the second portable device as an unauthorized portable device in response to determining that the second portable device corresponds to a second individual who is not authorized to view the selected information; and
    responsive to the detecting and the identifying the second portable device, applying, by the one or more processors, a rule to selectively obscure the selected information on the computer display.

2. The method of claim 1, wherein the rule dictates that the selected information is selectively obscured by obscuring the computer display rather than ending communication between a serving application and the computer display.

3. The method of claim 1, wherein the selectively obscuring comprises:
    immediately rebooting, by the one or more processors, a computer device that supports the computer display, wherein the computer device has a basic input-output system (BIOS) chip that has been configured to require an authentication by an authorized user in order to allow the computer display to display any content other than an authentication screen.

4. The method of claim 1, wherein the selectively obscuring comprises:
immediately displaying, by the one or more processors, a message on the computer display stating that the unauthorized portable device is proximate to the computer display and presenting an active window to selectively continue or terminate a current session on the computer display;
receiving, by the one or more processors, a user-selection on whether to continue or terminate the current session on the computer display; and
responsive to receiving the user-selection, selectively terminating, by the one or more processors, the current session on the computer display.

5. The method of claim 1, wherein the selectively obscuring comprises:
automatically obscuring, by the one or more processors, the selected information on the computer display until the unauthorized portable device is no longer detected within the area.

6. The method of claim 1, wherein the rule ends a session if the authorized device is no longer detected within the area.

7. The method of claim 1, further comprising, in response to determining that the authorized device is authorized for a specified period of time, applying the rule while the authorized device is detected within the area during the specified period of time.

8. The method of claim 1, wherein the rule allows a session to be continued while the unauthorized device is detected within the area if the authorized device is also detected within the area.

9. The method of claim 1, wherein the second portable device is authorized for a subset of computer displays supported by a computing environment within the area.

10. The method of claim 1, wherein the rule dictates that a session ends if an authorized device is not detected within the area for a predetermined period of time.

11. The method of claim 1, wherein the identifying, by the one or more processors, the first portable device as the authorized portable device comprises looking up, by the one or more processors, the first portable device in a table of authorized devices.

12. The method of claim 1, wherein the identifying the first portable device as the authorized portable device comprises determining, by the one or more processors, that the first individual is on a list of specific persons or titles of persons authorized to view the selected information.

13. The method of claim 1, further comprising:
receiving, from the first individual, approval of the second individual;
in response to the receiving, by the one or more processors, displaying the selected information in the presence of the unauthorized device and the authorized device.

14. A computer program product comprising a computer readable storage medium having program code embodied therewith, wherein the computer readable storage medium is not a transitory signal per se, wherein the program code is readable and executable by a processor to perform a method of securing a computer display, and wherein the method comprises:
detecting, by a wireless local area network (WLAN) router having a range tuned to an area within a predefined distance of the computer display, a first portable device within the area;
identifying the first portable device as an authorized portable device in response to determining that the first portable device corresponds to a first individual who is authorized to view selected information;
displaying, in response to the detecting and the identifying the first portable device, the selected information on the computer display;
detecting, by the WLAN router, a second portable device within the area;
identifying the second portable device as an unauthorized portable device in response to determining that the unauthorized portable device corresponds to a second individual who is not authorized to view the selected information; and
responsive to the detecting and the identifying the second portable device, applying a rule to selectively obscure the selected information on the computer display.

15. The computer program product of claim 14, wherein the rule dictates that the selected information is selectively obscured by obscuring the computer display rather than ending communication between a serving application and the computer display.

16. The computer program product of claim 14, wherein the selectively obscuring comprises:
immediately rebooting a computer device that supports the computer display, wherein the computer device has a basic input-output system (BIOS) chip that has been configured to require an authentication by an authorized user in order to allow the computer display to display any content other than an authentication screen.

17. The computer program product of claim 14, wherein the program code is provided as a service in a cloud environment.

18. A computer system comprising one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories, the stored program instructions executed to perform a method comprising:
detecting, by a wireless local area network (WLAN) router having a range tuned to an area within a predefined distance of the computer display, a first portable device within the area;
identifying the first portable device as an authorized portable device in response to determining that the first portable device corresponds to a first individual who is authorized to view selected information;
displaying, in response to the detecting and the identifying the first portable device, the selected information on the computer display;
detecting, by the WLAN router, a second portable device within the area;
identifying the second portable device as an unauthorized portable device in response to determining that the second portable device corresponds to a second individual who is not authorized to view the selected information; and
responsive to the detecting and the identifying the second portable device, applying a rule to selectively obscure the selected information on the computer display.

19. The computer system of claim 18, wherein the selectively obscuring comprises:
immediately rebooting a computer device that supports the computer display, wherein the computer device has a basic input-output system (BIOS) chip that has been configured to require an authentication by an authorized user in order to allow the computer display to display any content other than an authentication screen.

20. The computer system of claim 18, wherein the stored program instructions are provided as a service in a cloud environment.

* * * * *